Sept. 6, 1955  W. J. KINDERMAN  2,716,892
WATER GAGE ILLUMINATOR
Filed May 21, 1951  2 Sheets-Sheet 1
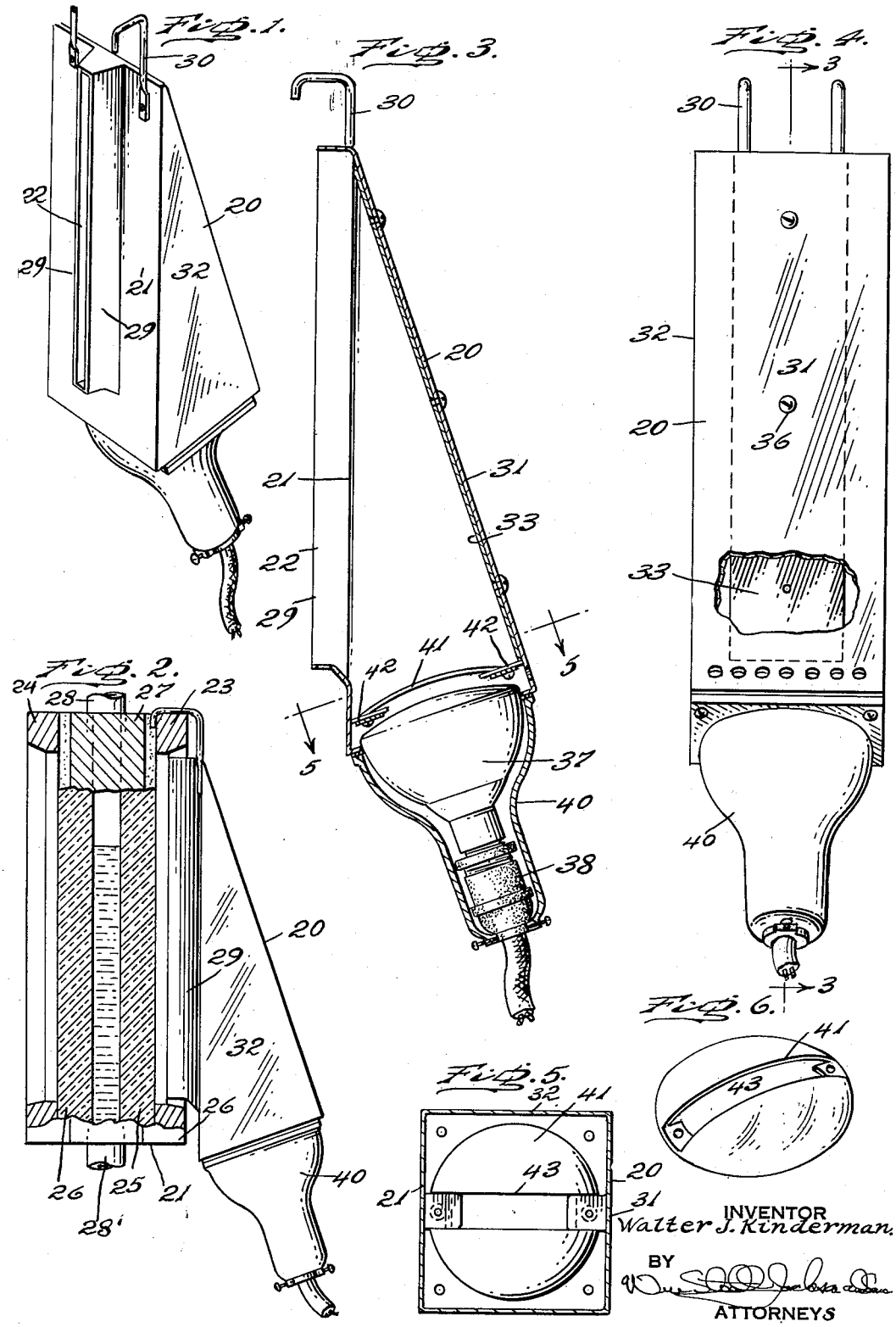
INVENTOR
Walter J. Kinderman
BY
ATTORNEYS Sept. 6, 1955  W. J. KINDERMAN  2,716,892
WATER GAGE ILLUMINATOR
Filed May 21, 1951  2 Sheets-Sheet 2
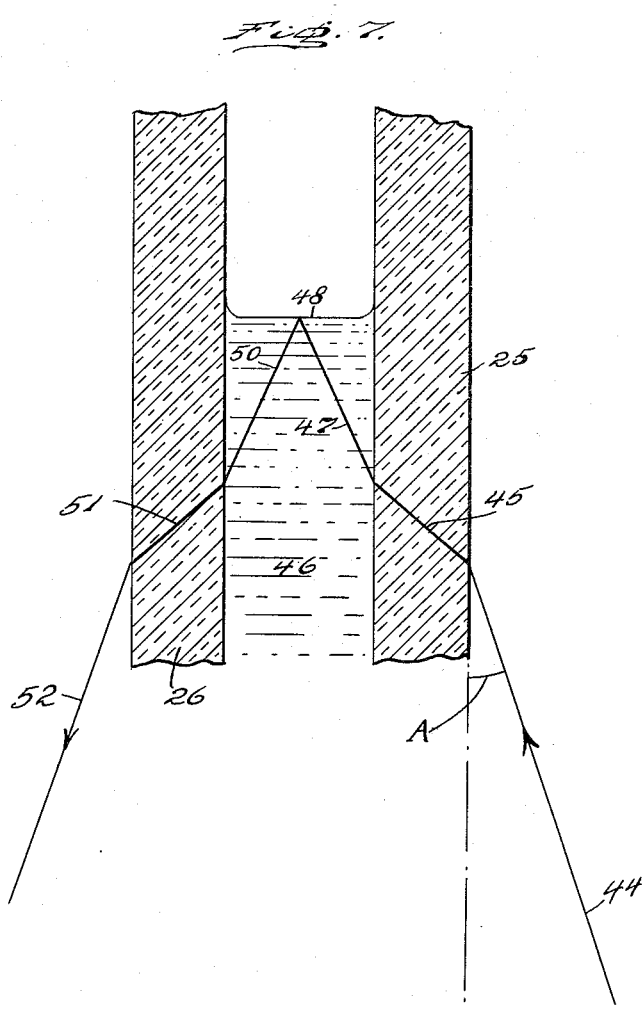
INVENTOR
Walter J. Kinderman.
BY
ATTORNEYS.

United States Patent Office 2,716,892
Patented Sept. 6, 1955

2,716,892
WATER GAGE ILLUMINATOR

Walter J. Kinderman, Philadelphia, Pa., assignor to Yarnall-Waring Company, Philadelphia, Pa., a corporation of Pennsylvania Application May 21, 1951, Serial No. 227,496

4 Claims. (Cl. 73—293)

The present invention relates to processes of illuminating liquid columns in liquid level gages, and to liquid level gages and illuminators therefor.

A purpose of the invention is to avoid the diffusion of the light normally obtained from the presence of dirt in the liquid in a liquid level gage.

A further purpose is to obtain sharp contrast at the meniscus of a liquid level gage notwithstanding the presence of dirt in the liquid.

A further purpose is to secure a sparkling effect at the meniscus of a liquid level gage, especially where dirt is present in the liquid.

A further purpose is to illuminate the liquid in a liquid level gage by light free from wave lengths which will be reflected by the dirt, employing light in which the dirt will appear black.

A further purpose is to project into the liquid from below and toward the meniscus light of wave length between 400 and 540 millimicrons, in the blue or green range, which will not be substantially reflected by the usual dirt predominantly of a color in the red or orange range.

A further purpose is to project into the liquid from below toward the meniscus light of intermittent arc character, preferably of wave length between 400 and 540 millimicrons, which will create a series of rapidly changing images on the fluctuating meniscus and thus cause the meniscus to sparkle.

A further purpose is to project the light into the liquid level column from below at an angle within the range of total reflection by the meniscus, so as to minimize the tendency of the light to pass directly through the liquid level column to the observer at points below the meniscus.

A further purpose is to illuminate the meniscus by light of a color different from the color of the dirt in the liquid, projected into the liquid column from below, and desirably from an intermittent arc source such as a mercury arc lamp.

Further purposes appear in the specification and in the claims.

In the drawings I have chosen to illustrate one only of the numerous embodiments in which my invention may appear, selecting the forms shown from the standpoints of convenience in illustration, satisfactory operation and clear demonstration of the principles involved.

Figure 1 is a perspective of the illuminator of the invention, with one of the hangers broken away.

Figure 2 is a side elevation of the illuminator of the invention applied to a diagrammatic liquid level gage, which is shown partly in section.

Figure 3 is a section of the illuminator of the invention on the line 3—3 of Figure 4.

Figure 4 is a rear elevation of the illuminator of the invention, broken away to show the reflector.

Figure 5 is a section of Figure 3 on the line 5—5.

Figure 6 is a perspective of the lamp cover and slit best seen in Figures 3 and 5.

Figure 7 is a diagram of the reflection from the meniscus, the gage being shown in axial vertical section.

In the drawings like numerals refer to like parts.

Light has been projected into the liquid column of a liquid level gage from below to illuminate the meniscus. This has been a useful procedure in liquids which are free from dirt, but where as in the usual case the liquid in the liquid level gage of a boiler or the like contains dirt, the light from the usual incandescent light source is extensively reflected from the dirt particles, causing a great amount of diffusion of light around the gage which interferes with the contrast at the meniscus and prevents intense illumination of the meniscus. In order to obtain visibility at a greater distance, the only solution in the prior art has been to apply greater intensity of illumination, which has resulted in greater diffusion of light from the dirt particles and less effective contrast.

A point has been reached at which increased light intensity alone no longer improves the visibility of the meniscus, and beyond that point increase in intensity of the light actually reduces the visibility by creating greater diffusion of light from the dirt particles below the meniscus.

An effort has been made in the prior art to render the demarkation at the meniscus more visible by projecting light of two colors horizontally through an insert type gage, and due to the difference in index of refraction in the steam and water spaces of the gage, make the water appear to be of one color and the steam appear to be of another color. The color which does not emerge from the gage in a particular position (the steam or the water space) is reflected by the side walls and cannot leave the inside of the gage. There is no effect of concentrating light at the meniscus. The light of the respective colors has been derived from color filters or screens applied to an incandescent light source and where green has been one of the colors used, it has not been green with the exclusion of all red, so that the dirt particles have been illuminated by light supplied with the green, which the dirt particles reflect and which illuminates them. Where green was used with red or orange as the other color, this other color reflects from the dirt particles and is seen by the observer, detracting from the sharpness of contrast between the steam and water spaces.

Thus it will be noted that in this prior art form the light is passed horizontally across the gage, and not directed upward upon the meniscus.

I have discovered that it is possible to effectively "black out" the dirt particles or render them non-luminous by projecting into the liquid and toward the meniscus light of a wave length which substantially omits the color or colors of the dirt particles. The dirt particles are usually formed as oxides of the metals used in the boiler or piping, especially iron, with or without minerals deposited from the water, and such dirt particles are usually of a rusty reddish, orange or brown color, which of course would reflect light predominantly in the red and orange range and to a considerable extent absorb light of other colors. Thus by illuminating with a light which is not substantially reflected by the dirt particles, such as blue or green light, there is no substantial reflection from the dirt particles and they appear black or not visible. Thus there is no substantial diffusion of light by the column of liquid containing the dirt below the meniscus and the meniscus stands out as intensely illuminated by contrast even in a dirty liquid. In fact, the blacking out effect of the particles is so pronounced that, unlike the prior art methods of illumination, by the present method of illumination the contrast of lighting at the meniscus is improved rather than diminished by the presence of dirt in the water or other liquid in the gage.

The rays from the source of illumination are suitably projected from below into the liquid of the column at an angle within the range at which total reflection takes place from the meniscus.

In most liquid level gages, especially boiler water gages, the meniscus is in constant state of agitation. This condition is created not only by vibration of the gage from traffic and other conditions, but more specially by dropping of condensate from the gas space into the liquid space of the gage, which upsets the tranquility of the meniscus.

I find that this effect which is generally present can be very effectively utilized to create a sparkling condition of the meniscus if the source of illumination is of a character which creates a rapid series of intense flashes.

Each of these light flashes creates an image of a slightly different form of the meniscus, due to the constant change in the meniscus as already explained, and the intermittent character of the intense images causes the meniscus to sparkle. I prefer to employ as a source of illumination an electric arc creating wave lengths of the desired character. The preferred embodiment is a mercury arc lamp which creates light in the green and blue range, with a high degree of intermittency. Any other arc creating the desired color, directly from the source, or by filtering out undesired colors, may be used, such as the electric arc carrying the coloration of any material giving a green or blue light, such as thallium, copper, lead or potassium.

If any substantial quantity of light which would be reflected by the particular color of the dirt is present, it will be filtered out before the light is applied to the illuminator.

The mercury arc lamp has the advantage that it is substantially devoid of red and orange wave lengths and with the ordinary reddish brown or orange dirt, the necessity of using a light filter is avoided.

Of course if the color of the dirt is different from the usual red, brown, or orange, a corresponding change will be made in the color of illumination to avoid in the light used the wave length which would be reflected by the dirt.

The fluctuation of the light source in the mercury arc lamp is also a desirable feature of this lamp, as it contributes greatly to the sparkle. This fluctuation should be at least as frequent as that produced by the usual commercial frequency (ordinarily 25 to 60 cycles) of the alternating current used to light the lamp. Thus in the mercury vapor lamp, operating on 60 cycle alternating current, the fluctuations are 120 per second, and the light intensity drops off very sharply between the peaks (to about 10 percent). It should be noted that the fluctuation effect from the arc such as the mercury vapor arc or one of the other arcs mentioned is much more pronounced than in the usual incandescent lamp, and therefore the arc source is highly desirable, whereas a usual incandescent lamp source is not suitable in order to obtain the sparkle effect, regardless of the color of the light.

As shown in the drawings, the illuminator of the invention comprises a body 20 suitably of sheet metal such as steel and desirably of wedge shape, having a vertical side 21 provided with a vertically extending opening 22 which is adapted to extend along the side of the liquid level gage against the illumination window.

The liquid level gage may be of any suitable character, preferably of the general type shown in D. Robert Yarnall U. S. Patent No. 1,992,455, granted February 26, 1935, for Liquid Level Gage. It includes a casing made up of slotted facing elements 23 and 24 each having a gage glass or window 25 or 26 on opopsite sides of a center slotted body 27 having an open interior and connected to the boiler or other vessel whose liquid level is being indicated at the top at 28 above the level and at the bottom at 28' below the level. The vertical side 21 desirably has spaced lips 29 protruding outwardly and forming a slit between the lips which in fact constitutes the vertical opening 22. The lips desirably protrude into the slotted face of the adjoining casing element of the gage to abut against the illumination window 25 of the gage and project light into the gage.

The illuminator is conveniently hung from the gage by hangers or hooks 30 secured at spaced points to the top of the illuminator casing, extending over the adjoining element 23 of the gage casing and hooking over the same. The back wall 31 of the illuminator casing suitably converges toward the vertical wall 21 at the top to create the wedge shape, and is united to the vertical wall by suitably vertical parallel end walls 32.

A reflector 33 is secured on the inside of the back wall 31 as by screws 36 and, like the back wall, converges upwardly toward the vertical wall. The reflector desirably has any highly reflecting inside surface, such as a bright nickel or chromium plate, or a white surface or bright aluminum surface.

At the bottom of the illuminator housing, directed into the space between the reflector and the vertical wall, a light source 37 is placed, in this case a mercury arc lamp in an electric socket 38. The socket is held to the bottom of the casing by a lamp housing 40 joined to the bottom of the casing. The light is restricted to a line which will fill the vertical opening 22 by a cover 41 secured by lugs 42 to the casing and providing a slit 43 in line with the slit between the lips 29.

It will be noted that the light is diagonally upwardly directed into the column of water in the gage from below toward the meniscus at an angle which is within the range for total reflection in the particular glass and liquid.

Figure 7 shows the entering beam of light 44 from the source 37 directly, or reflected from the reflector, which beam is refracted by the glass at 45 and by the water 46 in the gage at 47. The beam of light strikes the meniscus 48 from below and is reflected to produce a reflected beam 50, which is refracted at 51 in the glass and at 52 in the air as it travels toward the observer. In order to obtain total reflection at the meniscus, which will illuminate the meniscus, the angle A between the entering beam 44 and the vertical axis of the water column should be between 35° and 60°, preferably about 45°. When a reflector is used, this angle is the angle of the beam leaving the reflector and entering the gauge.

In operation it will be evident that the light from the source free from the wave lengths which correspond to the color reflected by the dirt is projected from below into the liquid up toward the meniscus, blacking out the dirt particles and accenting the illumination of the meniscus. The dirt particles are effectively blacked out, whether they be in the form of dirt suspended in the liquid or partially or wholly adhering to the inside of the glass, as is commonly the case in boiler gages.

Because the dirt particles are usually of orange, brown, or red color, the light source will desirably be in the range between 400 and 540 millimicrons wave length, that is, the blue or green range. It will be understood that some ultraviolet light may be present without preventing the luminous light from functioning.

The highly intermittent intense flashes produced by the arc light source, and especially the mercury arc lamp, cause an intense sparkle of the meniscus which has not previously been obtained by incandescent light sources regardless of color. This sparkling effect and the contrast resulting from the blackout of the dirt particles appears to be improved in an installation in which the liquid is dirty as compared to one in which the liquid is clean. Naturally the sparkle is improved by frequent rippling of the meniscus due to dropping down of condensate or vibration, although it is my experience that this in any case occurs frequently enough with a rapidly fluctuating light source such as an electric arc, so that a pronounced sparkle will be produced in any ordinary installation.

In view of my invention and disclosure, variations and modifications to meet individual whim or particular need will doubtless become evident to others skilled in the art, to obtain all or part of the benefits of my invention without copying the process and structure shown, and I, therefore, claim all such insofar as they fall within the reasonable spirit and scope of my claims.

Having thus described my invention what I claim as new and desire to secure by Letters Patent is:

1. A boiler liquid level sight glass gage comprising a sight glass unit for connection to a boiler unit at spaced vertical points for the boiler liquid to enter said unit and form a meniscus therein, and a source of luminous light consisting of light of wave length between 400 and 540 millimicrons disposed at the lower end of said gage unit with its rays directed upwardly into the liquid column at an angle within the range of total reflection from the meniscus.

2. A liquid level gage according to claim 1, in which said source of light is at least one mercury arc electric lamp having intermittent operation.

3. A liquid level gage illuminator comprising a body having one vertical side provided with a vertically extending opening and a mercury arc electric lamp positioned adjacent the bottom of the opening and directed diagonally upward toward the opening, producing luminous light limited to wave lengths between 400 and 540 millicrons in the optical range.

4. A liquid level gage illuminator comprising a body having one vertical side provided with a vertically extending opening, a diagonal reflector behind the vertical side converging upward toward the top of the opening and a mercury arc electric lamp positioned adjacent the bottom of the opening between the vertical side and the reflector and directed diagonally upwardly toward the opening, producing luminous light limited to wave lengths between 400 and 540 millicrons in the optical range.

References Cited in the file of this patent

UNITED STATES PATENTS

| | | |
|---|---|---|
| 1,273,413 | Sargl | July 23, 1918 |
| 1,967,477 | Miller | July 24, 1934 |
| 1,977,603 | Weston | Oct. 16, 1934 |
| 1,979,982 | McMullen | Nov. 6, 1934 |
| 2,356,267 | Pelunis | Aug. 22, 1944 |
| 2,369,798 | Rasmussen | Feb. 20, 1945 |

FOREIGN PATENTS

| | | |
|---|---|---|
| 400,309 | Great Britain | Oct. 26, 1933 |